(12) United States Patent
Nolan et al.

(10) Patent No.: US 7,603,541 B2
(45) Date of Patent: Oct. 13, 2009

(54) ARRAY SYNCHRONIZATION WITH COUNTERS

(75) Inventors: John Matthew Nolan, Bath (GB); Roger Paul Dealtry, Bath (GB)

(73) Assignee: Picochip Designs Limited, Bath (GB)

( * ) Notice: Subject to any disclaimer, the term of this patent is extended or adjusted under 35 U.S.C. 154(b) by 285 days.

(21) Appl. No.: 10/539,337

(22) PCT Filed: Dec. 12, 2003

(86) PCT No.: PCT/GB03/05451

§ 371 (c)(1), (2), (4) Date: Jun. 15, 2005

(87) PCT Pub. No.: WO2004/057487

PCT Pub. Date: Jul. 8, 2004

(65) Prior Publication Data

US 2006/0168423 A1      Jul. 27, 2006

(30) Foreign Application Priority Data

Dec. 20, 2002      (GB) ................................. 0229788.5

(51) Int. Cl.
  G06F 15/00      (2006.01)
  G06F 15/76      (2006.01)
(52) U.S. Cl. ...................................................... 712/16
(58) Field of Classification Search .................. 712/10, 712/16
  See application file for complete search history.

(56) References Cited

U.S. PATENT DOCUMENTS 4,589,066 A * 5/1986 Lam et al. .................... 713/375
4,937,741 A * 6/1990 Harper et al. ................ 713/375
4,974,146 A * 11/1990 Works et al. .................. 712/14

(Continued)

FOREIGN PATENT DOCUMENTS

GB          2 370 380          6/2000

(Continued)

OTHER PUBLICATIONS

Ishijima et al., A Semi-Synchronous Circuit Design Method by Clock Tree Modification IEEE Trans. Fundamentals, vol. E85-A, No. 12 Dec. 2002.

(Continued)

*Primary Examiner*—Eddie P Chan
*Assistant Examiner*—Corey S Faherty
(74) *Attorney, Agent, or Firm*—Potomac Patent Group PLLC (57) ABSTRACT

A method is disclosed for achieving synchronization in an array of semi-synchronous devices. A processor array has an array of processor elements, wherein each of said processor elements comprises a cycle counter, and a master processor element is able to transmit control command signals to each of the other processor elements. Each processor element is such that, on receipt of a control command signal, it acts on that signal only when its cycle counter reaches a predetermined value, and the master processor element is such that it transmits control command signals only when its cycle counter takes a value which is within a predetermined range, or "safe window". By appropriate setting of the "safe window", it can be guaranteed that, when the master processor element transmits a control command signal to each of the other processor elements, those command control signals are acted upon at corresponding times within the other processor elements.

14 Claims, 5 Drawing Sheets

U.S. PATENT DOCUMENTS

| | | | |
|---|---|---|---|
| 5,193,175 A * | 3/1993 | Cutts et al. | 714/11 |
| 5,233,615 A * | 8/1993 | Goetz | 714/12 |
| 5,239,641 A * | 8/1993 | Horst | 713/375 |
| 5,410,727 A * | 4/1995 | Jaffe et al. | 709/234 |
| 5,555,548 A * | 9/1996 | Iwai et al. | 709/208 |
| 5,557,751 A * | 9/1996 | Banman et al. | 398/136 |
| 5,600,784 A * | 2/1997 | Bissett et al. | 714/12 |
| 5,826,033 A * | 10/1998 | Hayashi et al. | 709/238 |
| 5,845,060 A * | 12/1998 | Vrba et al. | 714/12 |
| 5,923,615 A | 7/1999 | Leach et al. | |
| 5,963,609 A * | 10/1999 | Huang | 375/377 |
| 6,055,285 A | 4/2000 | Alston | |
| 6,381,293 B1 * | 4/2002 | Lee et al. | 375/377 |
| 2006/0251046 A1 * | 11/2006 | Fujiwara | 370/350 |

FOREIGN PATENT DOCUMENTS

WO    WO 02/50700 A2    6/2002

OTHER PUBLICATIONS

Greenstreet et al., Implementing a STARI Chip, IEEE 1995.

\* cited by examiner

ARRAY SYNCHRONIZATION WITH COUNTERS

This invention relates to a method for achieving synchronization of an array of devices, and to an array which can be synchronized in this way.

Electronic circuits are known, which include an array of devices, for example an array of processing elements, which operate in parallel. In order to ensure that these elements operate correctly, it is necessary to achieve a degree of synchronization between them. For example, when the processing elements must communicate with each other, or must send data to another device, it is necessary to ensure that the degree of synchronization is such that the data are received at the expected times.

One way to try and achieve this is to transmit control signals direct to each device in the array. Thus, each device has an individual control line, which is wired in parallel to the control lines used by other devices. The control lines may be wires or PCB tracks, for example. In order to ensure that the control signals arrive coincidentally at all of the devices, these control lines must be delay balanced to a relatively close tolerance. That is, the control lines must be designed so that their lengths are effectively the same, or buffers must be introduced into the control lines to cancel any differences in the lengths.

In particular, arrays of semi-synchronous devices are known, which are notionally running at the same clock frequency, but whose relative phases cannot be guaranteed and are not constant. An array of this type can be formed where the devices each receive a common input clock, but multiply the clock frequency internally by means of a phase locked loop to generate the actual clock which is used within the device. The effect of this will be that the relative phases of the internal clocks in any two devices will be unknown, and will vary due to jitter.

In the case of an array of semi-synchronous devices, even well balanced control lines to the devices in the array may not be sufficient to ensure correct operation of the array. As a result of the effect described above, if two devices receive control signals instructing them to start a process and to stop a process, then the two devices may operate that process for different numbers of clock cycles.

Moreover, in the case of semi-synchronous devices, there is a problem in that data communications from one device to another will be received with uncertainty as to the relative timings of the processes running on the two devices.

According to a first aspect of the present invention, there is provided a method of achieving synchronization in an array of semi-synchronous devices.

More particularly, there is provided a processor array, comprising an array of processor elements, wherein each of said processor elements comprises a cycle counter, and wherein at least one of said processor elements is able to transmit control command signals to each of the other processor elements, each processor element being such that, on receipt of a control command signal, it acts on that signal only when its cycle counter reaches a predetermined value, and said one of said processor elements being such that it transmits control command signals only when its cycle counter takes a value which is within a predetermined range.

This has the advantage that, by appropriate setting of the predetermined range, when one of said processor elements transmits a control command signal to each of the other processor elements, it can be guaranteed that those command control signals are acted upon at corresponding times within the other processor elements.

Reference will now be made, by way of example, to the accompanying drawings, in which.

The invention relates to devices which include an array of processing elements. For example, the invention may be applied to the device disclosed in GB-A-2370380, which includes an array of processing elements, which operate in parallel on received data. In practice, the array may include several hundred such processing elements, or more.

Figure 1:
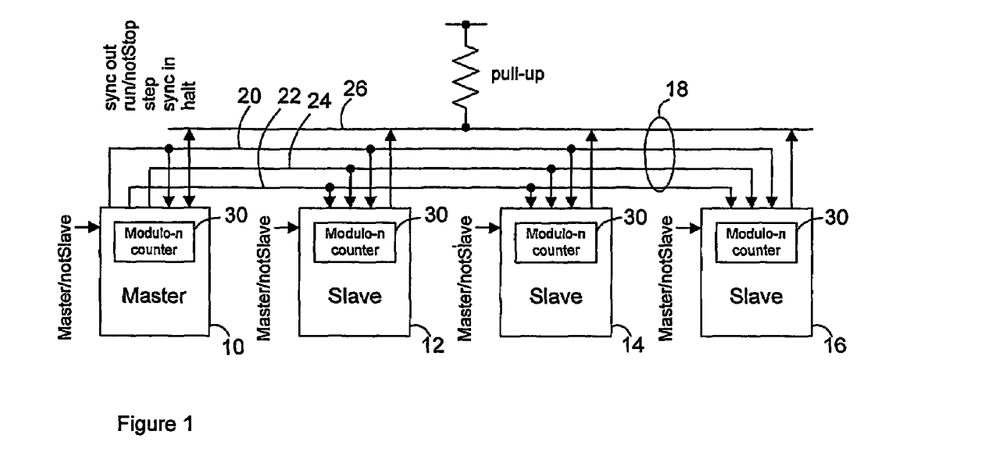
FIG. 1 is a block schematic diagram of a part of an array in accordance with the present invention.

FIG. 1 shows a very small part of an array, having just four elements 10, 12, 14, 16 for ease of illustration. Each of these elements may for example be processors, receiving data from one or more of the other elements in the array, and transmitting output data to one or more of the other elements in the array. In order to ensure that the array operates as intended, it is necessary for there to be a degree of synchronization between the elements. The elements in the array are in fact semi-synchronous devices, which are notionally running at the same clock frequency, but whose relative phases cannot be guaranteed and are not constant.

One of the elements 10, 12, 14, 16 is designated as the master synchronization element, while the others act as slave synchronization elements. The master element is selected by means of a signal on its Master/notSlave input. In the illustrated example, the element 10 is designated as the master element, while the elements 12, 14, 16 are designated as slave elements. Preferably, the elements are all designed such that any one of them may be designated as the master element, as desired. Once it is determined which element is to be the master element, other features of the design follow from that decision, as described below.

Although, in this case, the master element is shown as one of the processing elements in the array, which has the same functionality as the other array elements, it is possible to provide a master element which does not have all of the functionality of the other array elements.

There is a four-wire interface 18 between the elements 10, 12, 14, 16, and these wires provide the available synchronization communications between the elements. Data communications between the array elements take place over a separate set of data lines, as described in detail in GB-A-2370380, and this aspect of the operation of the array will not be described further herein. The four wires are a synchronization line 20, a run line 22, a step line 24 and a halt line 26. Each of the elements 10, 12, 14, 16 is connected to these wires in parallel. In a large array, there may be buffers on the wires. The synchronization line 20 has an input to the slave elements 12, 14, 16, and both an output from and an input to the master element 10. The run line 22 and the step line 24 both have outputs from the master element 10, and inputs to the slave elements 12, 14, 16. The halt line 26 has an open drain, and is also sensed as an input in the master element 10.

Each of the elements 10, 12, 14, 16 maintains a respective modulo-n cycle counter 30, as described further below. The number "n" should be chosen to be large enough to cope with the communication delays and delay spread due to the size and nature of the array, but kept as small as possible to minimise control latency and resolution. The value of "n" is scaleable, and allows the size of the array to be scaleable.

These modulo-n cycle counters control both when a control command can be transmitted from the master element 10, and when it should be acted upon, in the master element 10 and the slave devices 12, 14, 16. In general terms, the control command signal is sent ahead of time, to account for the overall path lengths to each device and the differential path lengths between devices. The modulo-n counter in each device cycles around (from 0 to n−1, 0 to n−1, 0 to n−1, ...), and received control command signals are only acted upon when the cycle counter next passes through zero.

Figure 2:
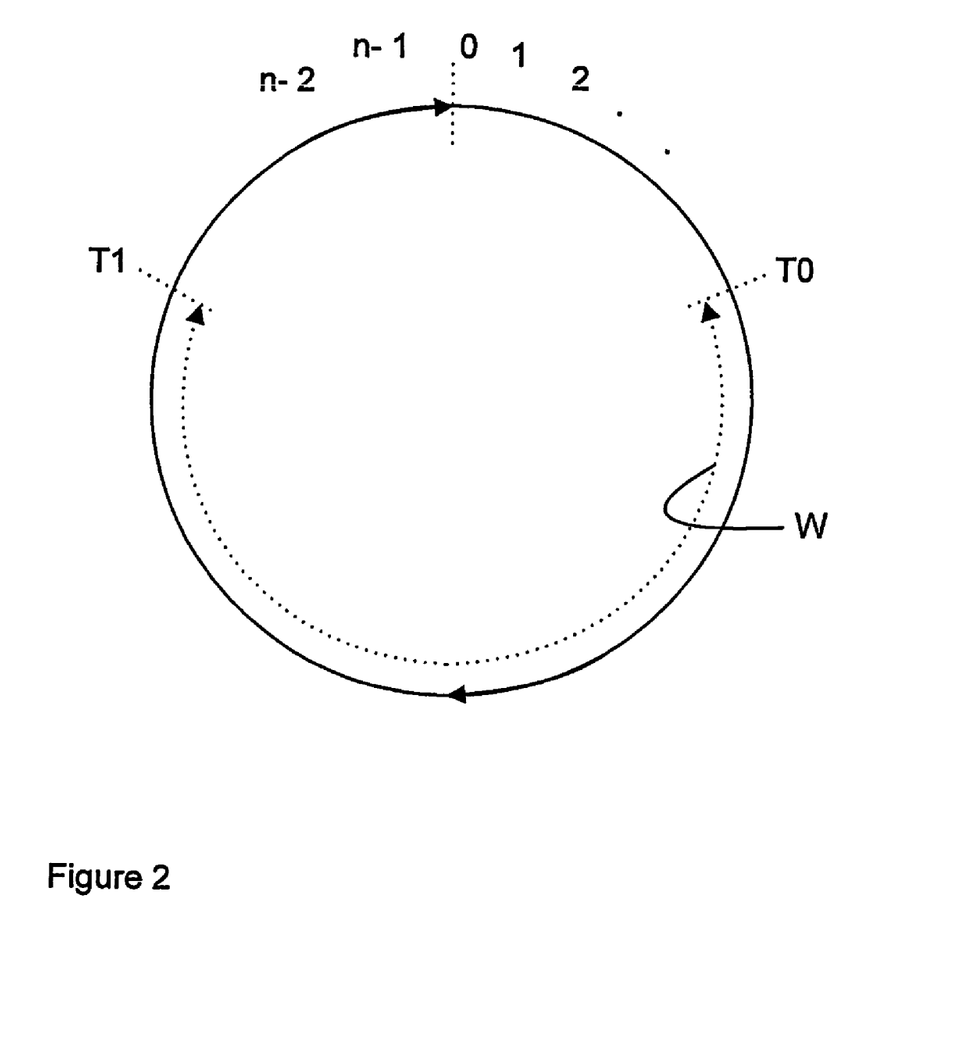
FIG. 2 illustrates the timing within a device in the array of FIG. 1.

The result is that there is a safe window, within which the Master device can transmit the control command signals. As shown in FIG. 2, the safe window starts at some time T0 after zero and ends at some other time T1 before zero. For command control signals transmitted within the safe window W, there will be no ambiguity in any of the receiving devices. That is, there will be no uncertainty as to whether the receiving device will sense the control command signal before or after the intended zero point.

All of the parameters defining the safe window are soft and, although the array may be provided with default values on manufacture, the parameter values can be reconfigured away from the default values if necessary for the particular physical implementation.

It is necessary for the cycle counter in each of the devices in the array to be synchronised to within less than +/−n clock cycles, and ideally to within +/−1 clock cycle, although looser margins can be supported if that is all the application requires. This synchronization is achieved over the synchronization line 20 of the four-wire interface 18, using the conventional method of a parallel tree that is delay-balanced to a good tolerance to propagate the necessary "sync" signal. The delay balancing of this parallel tree is determined based on which of the array elements is designated as the master element.

Only the synchronization signal requires this degree of synchronization. The other control command signals can be very loosely constrained and thus their respective wires of the four-wire interface 18 are more easily and cheaply implemented in hardware.

The master element 10 transmits a short pulse on its output to the synchronization line 20. This is fed to the inputs from the synchronization line 20 on all of the slave elements 12, 14, 16, and also back to its own input from the synchronization line 20. Feeding the "sync" signal back to the master element 10 via the same tree as the signal that connects to the slave elements means that all devices receive the "sync" signal together. This keeps the system scaleable.

Upon receiving the "sync" signal, each device in the array restarts its cycle counter from zero. This synchronization operation should be the first operation which the system carries out after power has been applied, and transient effects have settled. It should be performed before any other global control operations. The synchronization operation is only carried out once, so there can be no errors introduced by the relative phases of the clocks in the devices varying from one time to another time.

Once the devices in the array have had their cycle counters synchronized, start and stop command signals can be issued from the master element 10 to control the processes running on the devices in the array in a lock-step manner.

Figure 3:
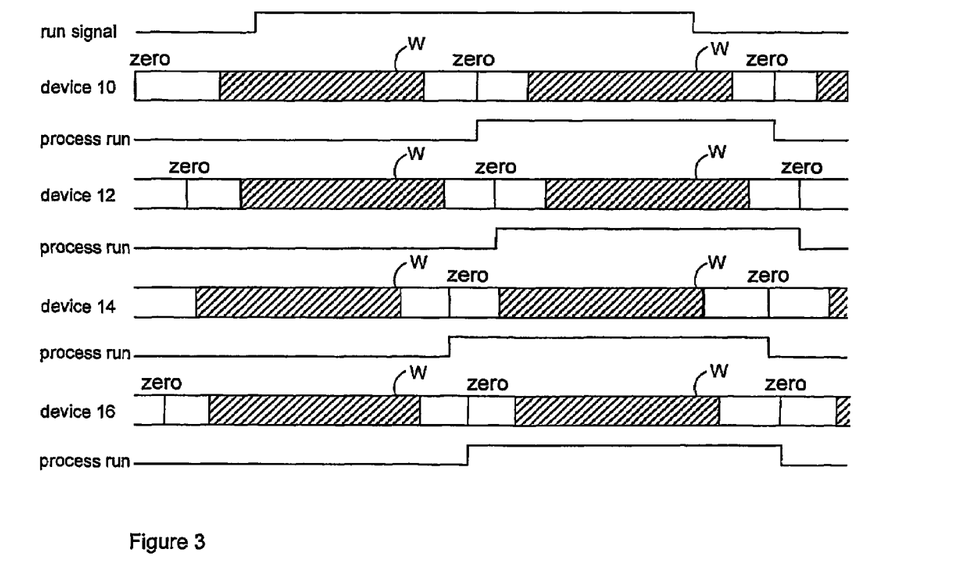
FIG. 3 illustrates the relative timings of the devices in the part of the array shown in FIG. 1.

FIG. 3 shows the operation of the array in this respect. For each of the devices 10, 12, 14, 16, FIG. 3 shows the time history of a particular process in the device. Thus, within each device, there is a cycle of equally spaced zeroes, although these are not synchronized between the devices. In each cycle, there is a safe window, and the master device 10 only transmits command control signals within that time period. Thus, when it is determined in the master device that a process should start in each of the slave devices, then, in the next available safe window, the master device 10 issues a start command by taking the run signal high on the run line 22.

Each of the slave devices 12, 14, 16 sees this change in level at some point later and, as shown in FIG. 3, they commence running their processes as their cycle counter next passes zero.

Similarly, when it is determined in the master device that a process should stop in each of the slave devices, the master device 10 takes the run signal low on the run line 22, and the slave devices 12, 14, 16 respond by stopping their processes as their respective cycle counters next pass zero.

It can be seen in FIG. 3 that all devices run for exactly the same amount of time, in this case for n cycles, or one full rotation of the modulo-n counter. This is achieved by transmitting the command control signals within the safe window of the master device 10, having ensured that this safe window is defined such that transmitted command control signals are acted upon by the slave devices at corresponding times in their respective cycles. Optimally, the modulo-n counters in the devices should all be synchronised to within +/−1 cycle of the modulo-n counters in the other devices, but looser margins of synchronization can be accommodated, by adjusting the duration of the safe window, to ensure no possibility of ambiguity in the timing of the control signals.

That is, the time between the end of the safe window of the master device 10 and the zero point in any other device must be positive, and greater than the propagation delay of the command control signals, even allowing for any uncertainty. Closer synchronization of the modulo-n counters in the devices allows the maximum possible duration of the safe window.

As described therefore, the system allows each device to be controlled to operate for the same number of process cycles, but it is evident that this only allows a resolution of "n" in the number of cycles the system can be running. For example, in the case of a system where each device has a modulo-32 cycle counter, the system can only be stopped after 32, 64, 96, 128, etc. cycles. (This assumes that the process cycles are of the same duration as the cycles of the modulo-n counters, although it would also be possible for the process cycle rate to be some integer multiple of the cycle rate of the modulo-n counters.)

To allow devices to be run for an arbitrary number of cycles, the remainder of the required cycle count after starting and stopping as described above for (k×n) process cycles (where k is an integer chosen to make (k×n) be less than, but as close as possible to, the required cycle count) can be made up by singlestepping. To achieve this, the master device 10 issues a step pulse on the step line 24, in the next available safe window and all devices advance by one process run cycle as their cycle counters next pass zero. This can be repeated multiple times until the required number of running cycles has been achieved. All devices will then have run for exactly the same number of process cycles. In the case of the system described above, with modulo-32 cycle counters, if it is intended that the devices should run for 74 cycles, this can be made up of two full run cycles each of 32 process cycles, and ten singlesteps, since 32+32+10=74.

Thus, as described, this arrangement allows for stopping a process while it is running. For example, in the case of the 74 cycle process mentioned above, it would be possible to stop this process after 32 cycles, or after 64 cycles, or after 65 cycles, etc. There may be a delay before the stop occurs, but all devices will have run for exactly the same number of cycles. There is a state machine within the master device, which calculates what commands to issue at what time based upon the requests of the user. In order to maximise the efficiency of this arrangement, the state machine could be designed so that it outputs a stop command and a step command at the same time.

In some situations, it may be desirable for any device, including one of the slave devices, to be able to call for a stop. For example, this could be due to an error condition or breakpoint being sensed, some kind of interrupt, or for any other reason. In order to maintain running cycles parity between all devices, the device requesting the halt cannot do so directly. The halt line 26 is an open drain line, that is pulled high normally, but any one of the devices 10, 12, 14, 16 on the line may pull it low, and this can then be sensed in the master device 10. This is scaleable by simple wiring up to a point, and buffers or logic gates can be used for very large arrays. When the master device 10 senses a signal on the halt line 26, it then generates a stop, as described above, in the next safe window. This therefore allows for halting a process while it is running. There is potentially a delay of up to (2.n) process run cycles, after the halt line 26 is pulled low, before the stop occurs in the devices, but it is ensured that all devices will have run for exactly the same number of process run cycles.

The timing of the control signals arriving at each device relative to the sampling clock of that device is unknown and uncertain. If the signal has a transition too close to the sampling clock transition, then the resulting sampled signal can be metastable. This metastability can propagate and cause errors to be introduced.

Further, if the system is required to be particularly tight, or the external delay-balancing of the sync signal is difficult, due to physical restrictions, then it makes sense to have provisions inside the devices to account for this.

Figure 4:
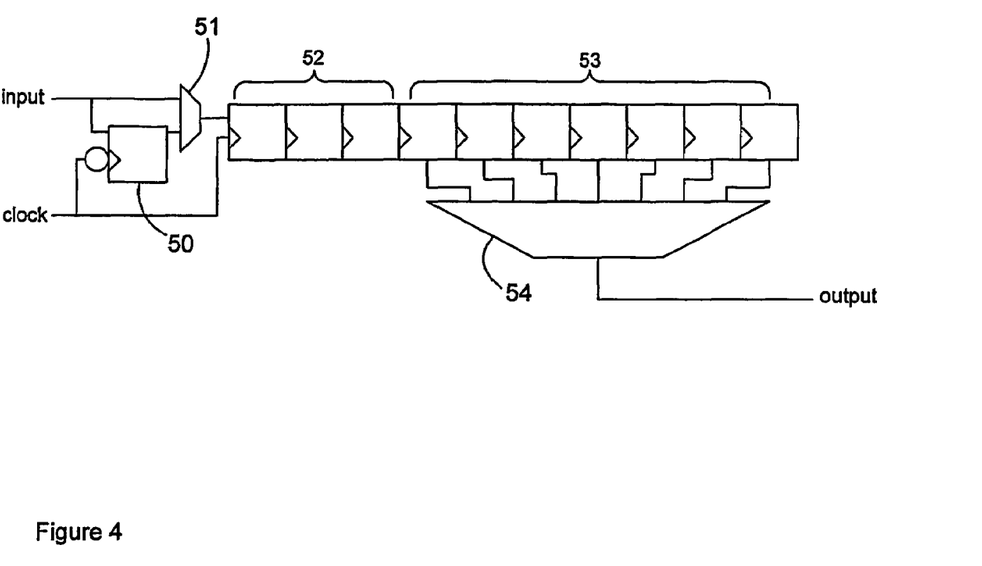
FIG. 4 is a block schematic diagram of a part of one of the devices shown in FIG. 1.

FIG. 4 shows a part of one of the devices 10, 12, 14, 16, which are all similar in this respect, dealing with the issues of metastability and delay-balancing. An input command control signal is passed to a multiplexer 51 and to an inverted clock register 50. The output of the inverted clock register 50 forms the second input to multiplexer 51. The output of the multiplexer 51 is passed into a chain of three anti-metastability registers 52 and then to a further chain of registers forming a short, tapped delay line 53. The output can be taken from any of the registers 53, via an output multiplexer 54.

Thus, the anti-metastability registers 52 form part of a tapped delay line, which has a minimum delay set to 3 clock periods. This reduces the probability of error (and hence the mean time between failures) to an acceptable level.

The tapped delay line allows the effective arrival time of the control signals to be altered for each device individually, in order to equalise the different external path delays.

The inverted clock register 50 effectively acts as an additional ½ cycle register at the input of the delay line. This is the same as the other registers in the delay line except that it takes an inverted clock. This gives a tapped delay line with ½ cycle accuracy in each device that can be soft configured to fine tune the system for particularly tight requirements, or simply left at the default configuration for the general case.

The delays in the devices within the array can be set when designing the array, or after measuring the delays which arise in prototype arrays.

As described so far, the invention provides a way of achieving synchronization of two or more devices, to within known limits, and of transmitting control command signals between the devices such that they operate for the desired number of process run cycles. A further aspect of the invention provides for data communication between two or more devices, in order to ensure that the semi-synchronous devices operate their processes on the intended data.

Figure 5:
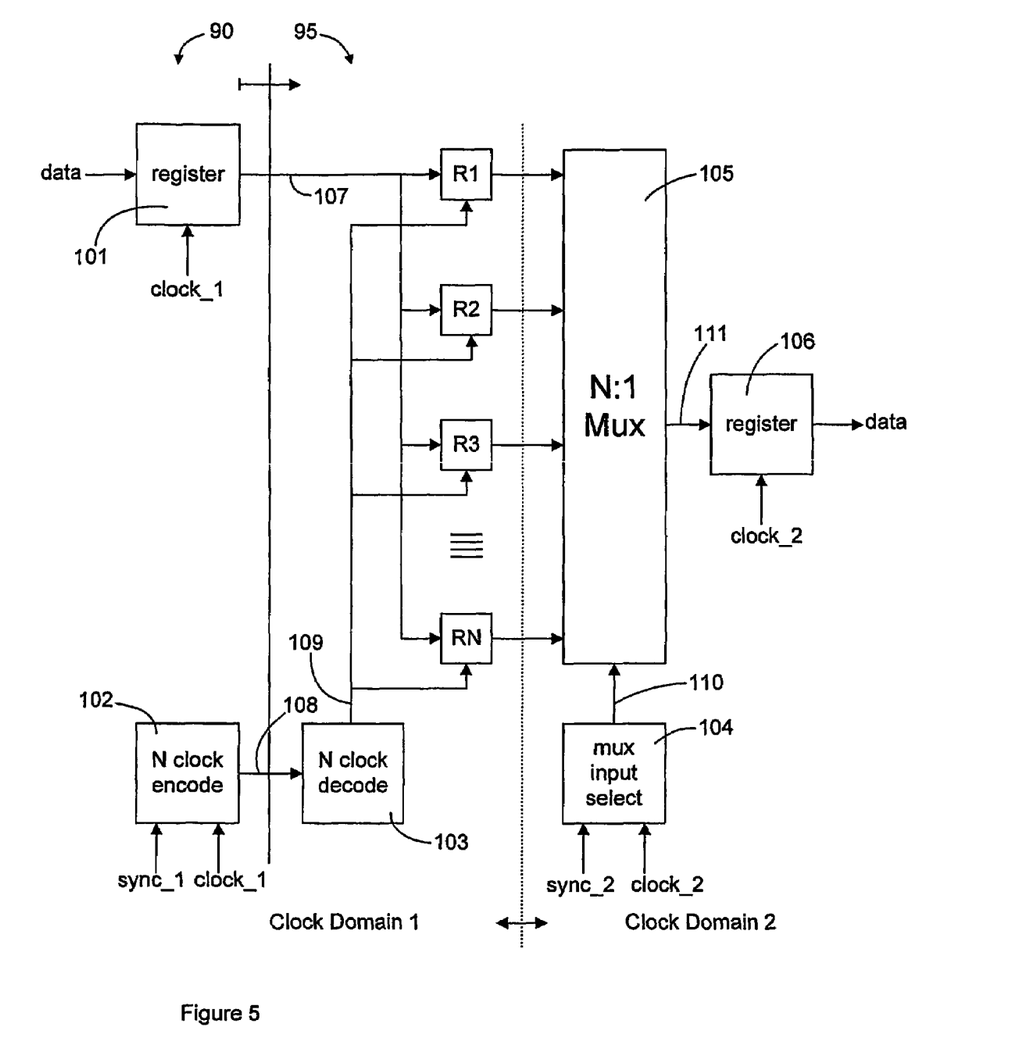
FIG. 5 is a block schematic diagram of parts of two devices in an array according to the present invention.

FIG. 5 is a block schematic diagram of parts of two devices 90, 95, which may for example be any two of the semi-synchronous devices described above. The first device 90 has a sending register 101, and data is clocked into the sending register 101 at a first frequency defined by the clock of the first device 90, clock_1. The first device 90 also includes an N clock encode block 102, which contains a state machine. The state machine is also clocked by the clock of the first device 90, clock_1, and produces one of N states cyclically during consecutive cycles of clock_1. The sequence of N states preferably forms a Gray code. The state machine is also preset to a known value at a time T1 by a synchronizing signal sync_1 generated within the first device 90.

The data is communicated to the second device 95 over the connection 107, and the state information from the N clock encode block 102 is communicated to the second device 95 over the connection 108.

Within the second device 95, there is an N clock decode block 103, which receives the state information and generates sequences of N signals 109, which are used to load the received data cyclically into the registers R1, R2, R3, . . . , RN under the control of the received state information. Thus, each received data word is available in one of the registers R1 to RN for N clock cycles.

This process, in the second device 95, therefore operates under the control of the clock signal of the first device 90, clock_1, and is effectively in a first clock domain. By contrast, the process for retrieving the data from the registers operates under the control of clock signal of the second device 95, clock_2, and is effectively in a second clock domain.

The second device 95 includes a multiplexer input select block 104, which produces output signals 110 describing one of N states cyclically during consecutive cycles of clock_2. It is also preset to a known value at a time T2 by a synchronizing signal sync_2 generated within the second device 95.

The signal 110 is sent to an N:1 multiplexer block 105, which selects the data words stored in the registers R1 to RN, in the same sequential order in which these registers are updated. The selected data words are the supplied on a multiplexer output 111 to a register 106, which is clocked with the clock of the second device 95, clock_2.

The operation of these blocks is such that the data in the signal 111 is guaranteed to be stable at the input to the register 106, when clocked with the clock of the second device, clock_2, provided that the timing discrepancy between the two devices 90, 95 is less than N clock cycles. As mentioned above, this degree of synchronization can be achieved by means of the scheme described above with reference to FIGS. 1-4.

The modulo-n counter 30 in the first device 90 may advantageously by clocked by the clock signal of the first device, clock_1, while the modulo-n counter 30 in the second device 95 may advantageously by clocked by the clock signal of the second device, clock_2. As mentioned above, however, it would also be possible for clock_1 and/or clock_2 to be some integer multiple of the cycle rate of their respective modulo-n counters.

Figure 6:
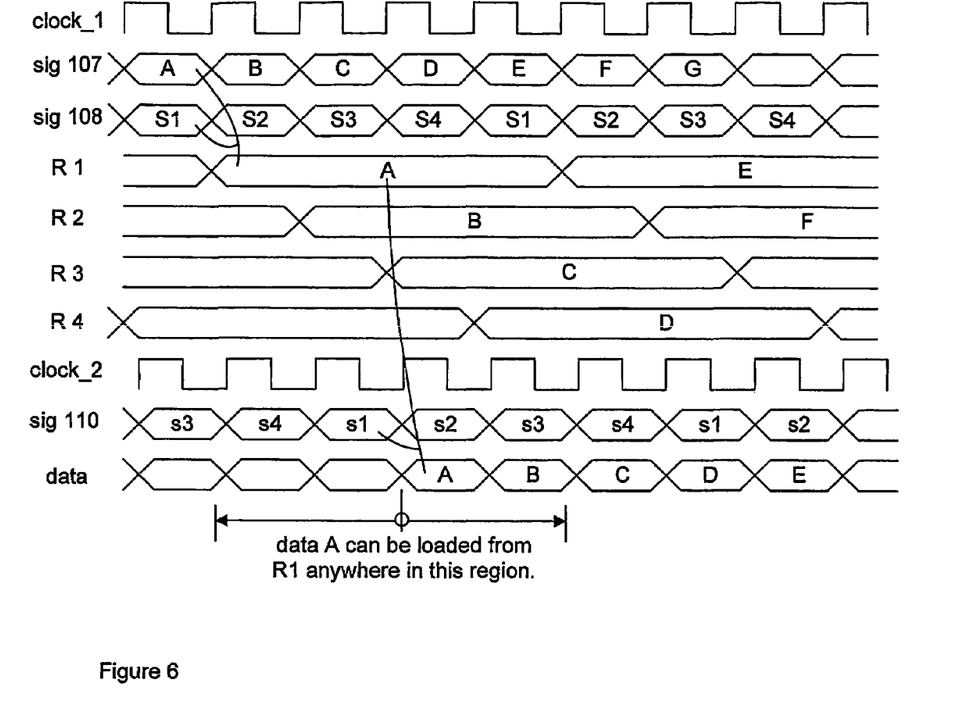
FIG. 6 is a timing diagram illustrating the operation of the devices shown in FIG. 5.

FIG. 6 is a timing diagram illustrating the case where N=4 in FIG. 5. Thus, the clock of the first device 90, clock_1, produces a series of clock pulses at a first frequency, and a series of data words A, B, C, D, E . . . is clocked into the sending register 101 of the first device 90 at the first frequency defined by the clock of the first device 90, clock_1. At the same time, the N clock encode block 102, which is also clocked by the clock of the first device 90, clock_1, produces the four states S1, S2, S3, S4, S1 . . . cyclically during consecutive cycles of clock_1.

The data words A, B, C, D, E . . . are communicated to the second device 95 over the connection 107, and the state information S1, S2, S3, S4, S1 . . . is communicated to the second device 95 over the connection 108.

Within the second device 95, the N clock decode signals are used to load the received data cyclically into the registers R1, R2, R3, . . . , RN under the control of the received state information. Thus, the data word A is loaded into the register R1, the data word B is loaded into the register R2, the data word C is loaded into the register R3, and the data word D is loaded into the register R4, then the data word E is loaded into the register R1, and so on, such that each received data word is available in one of the registers R1 to R4 for 4 clock cycles.

The second device 95 includes a clock signal generator, which produces clock pulses, clock_2. The multiplexer input select block 104 produces output signals s1, s2, s3, s4, s1, . . . on line 110 cyclically during consecutive cycles of clock_2.

The signals on line 110 are sent to an N:1 multiplexer block 105, which selects one of the data words stored in the registers R1, R2, R3 and R4, depending on whether the signal on line 110 takes the value s1, s2, s3 or s4, respectively. The selected data words are the supplied on a multiplexer output 111 to a register 106, which is clocked with the clock of the second device 95, clock_2.

Since each data word remains in the respective one of the registers R1 to R4 for 4 cycles (in the case where N=4), it is not necessary for the two clock signals clock_1 and clock_2 to be exactly synchronized. It is only necessary for them to be synchronized to within 4 clock cycles, as the data word is available to be loaded from the register for this length of time.

There is therefore described a system which ensures that two devices can be synchronized to within a required number of cycles, and a system which ensures correct data transfer between two devices which are synchronized to within a known number of cycles.

The invention claimed is:

1. A processor array, comprising an array of processor elements, wherein each of said processor elements comprises a modulo-n cycle counter, and wherein at least one of said processor elements is able to transmit control command signals to each of the other processor elements, each processor element being such that, on receipt of a control command signal, it acts on that signal only when its cycle counter reaches a predetermined value, and said one of said processor elements being such that it transmits control command signals only when its cycle counter takes a value which is within a predetermined range, said predetermined range being a subset smaller than a set of n possible values of the modulo-n cycle counter, the processor array further comprising a first connection between each of said processor elements, wherein said one of said processor elements is able to transmit synchronization control command signals on said first connection, and wherein each processor element acts on a synchronization control command signal received on said first connection by restarting its cycle counter.

2. A processor array as claimed in claim 1, comprising a second connection between each of said processor elements, wherein said one of said processor elements is able to transmit start and stop control command signals on said first connection, and wherein each processor element acts on start and stop control command signals received on said first connection.

3. A processor array as claimed in claim 2, wherein a start control command signal comprises a first binary signal level on said first connection, and a stop control command signal comprises a second binary signal level on said first connection.

4. A processor array as claimed in claim 2, comprising a third connection between each of said processor elements, wherein each of said processor elements is able to place a halt request signal on said second connection, and said one of said processor elements detects any halt request signal placed on the second connection, and acts on a detected halt request signal by transmitting a stop control command signal on said first connection.

5. A processor array as claimed in claim 1, comprising a fourth connection between each of said processor elements, wherein said one of said processor elements is able to transmit step control command signals on said third connection, and wherein each processor element acts on a step control command signal received on said third connection by performing one process step.

6. A processor array as claimed in claim 1, wherein each processor element comprises a programmable delay line, for applying a programmed delay to received control command signals.

7. A processor array as claimed in claim 6, wherein each programmable delay line has a minimum programmable delay.

8. A processor array as claimed in claim 1, wherein said processor elements include a transmit element and a receive element, and wherein:

said transmit element comprises means for transmitting data words in association with respective code words, said code words being used in a predetermined sequence; and said receive element comprises:

means for storing received data words in respective registers, the respective registers being determined on the basis of the code words associated with the data words, such that each received data word is stored in its respective register for the duration of said predetermined sequence of code words; and means for retrieving data words from the respective registers.

9. A processor array as claimed in claim 8, wherein said means for retrieving data words from the respective registers comprises a multiplexer, connected to all of the registers, and means for selecting an output from each of the registers in turn.

10. A processor array, comprising an array of processor elements, wherein each of said processor elements comprises a modulo-n cycle counter, and wherein at least one of said processor elements is able to transmit control command signals to each of the other processor elements, each processor element being such that, on receipt of a control command signal, it acts on that signal only when its cycle counter reaches a predetermined value, and said one of said processor elements being such that it transmits control command signals only when its cycle counter takes a value which is within a predetermined range, said predetermined range being a subset smaller than a set of n possible values of the modulo-n cycle counter, wherein said processor elements include a data transmit element and a data receive element, and wherein:

said data transmit element comprises means for transmitting data words in association with respective code words based on a transmit clock, said code words being used in a predetermined sequence; and said receive element comprises:

a decoder, for deriving from signals received from a transmitting processor element a first clock corresponding to the transmit clock of the transmitting processor, and for storing received data words in respective registers based on the first clock, the respective registers being determined on the basis of the code words associated with the data words, such that each received data word is stored in its respective register for the duration of said predetermined sequence of code words; and means for retrieving data words from the respective registers based on a receive clock.

11. A processor array, comprising an array of processor elements, wherein each of said processor elements comprises a modulo-n cycle counter, and wherein a first of said processor elements is able to transmit control command signals to each of the other processor elements, each processor element being such that, on receipt of a control command signal, it acts on that signal only when its cycle counter reaches a predetermined value, and said first of said processor elements being such that it transmits control command signals only when its cycle counter takes a value which is within a predetermined range, said predetermined range being a subset smaller than a set of n possible values of the modulo-n cycle counter, the processor array further comprising:

a start and stop control connection between each of said processor elements, wherein said first of said processor elements is able to transmit start and stop control command signals on said start and stop control connection, and wherein each processor element acts on start and stop control command signals received on said start and stop control connection; and a halt connection between each of said processor elements, wherein each of said processor elements is able to place a halt request signal on said halt connection, and said first of said processor elements detects any halt request signal placed on the halt connection, and acts on a detected halt request signal by transmitting a stop control command signal on said start and stop control connection.

12. The processor array of claim 1, wherein each processor element acts on the control command signal only during a time when its cycle counter holds the predetermined value.

13. The processor array of claim 10, wherein each processor element acts on the control command signal only during a time when its cycle counter holds the predetermined value.

14. The processor array of claim 11, wherein each processor element acts on the control command signal only during a time when its cycle counter holds the predetermined value.

\* \* \* \* \*